United States Patent Office 3,469,705
Patented Sept. 30, 1969

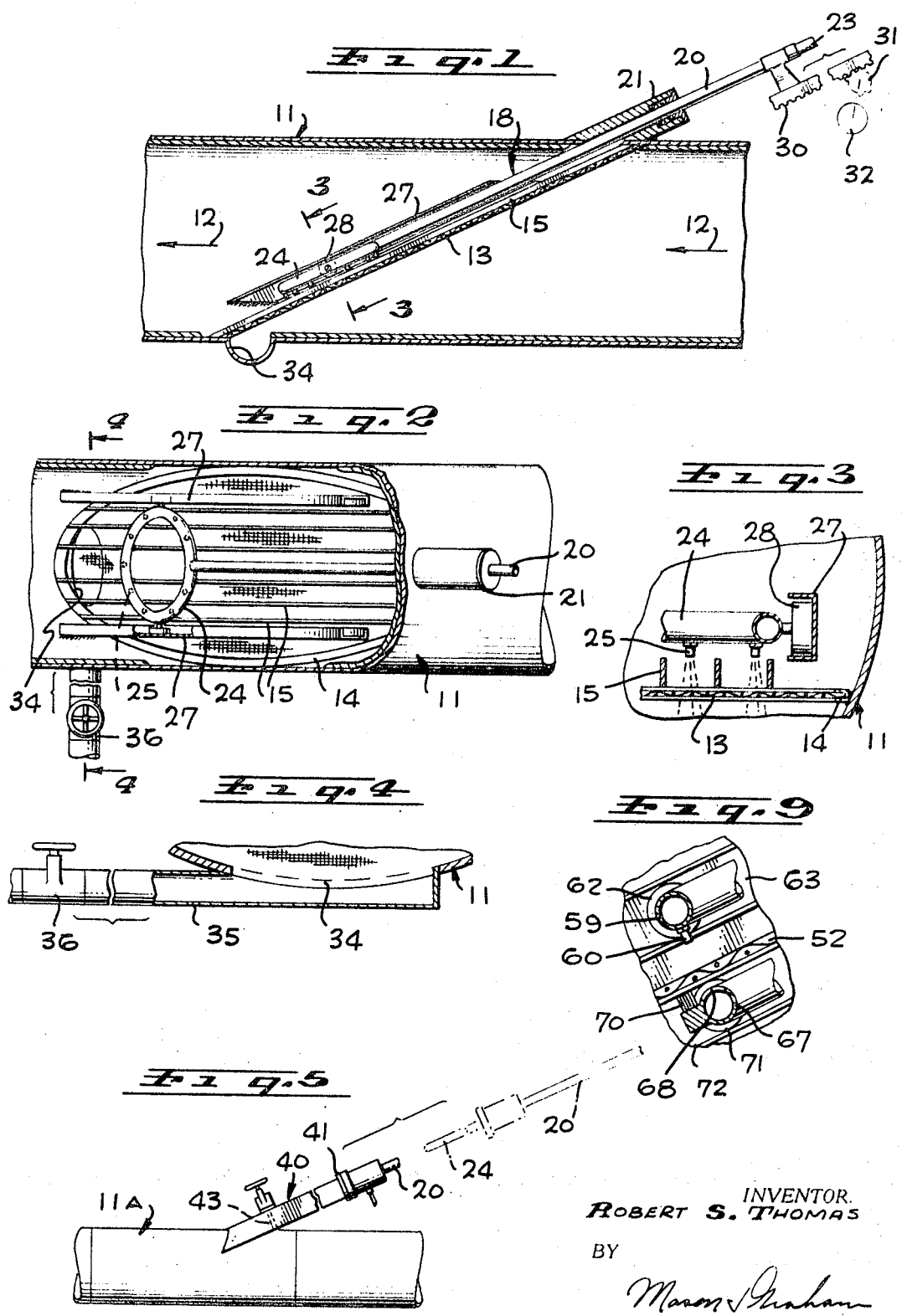

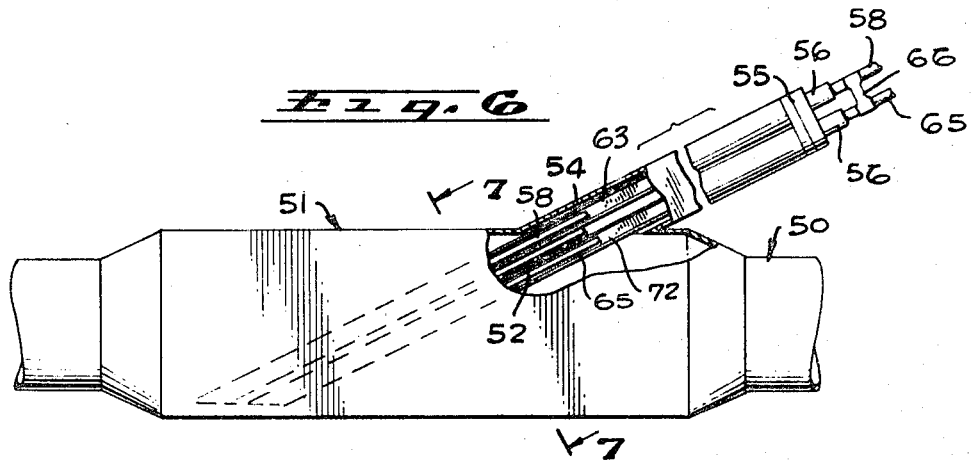
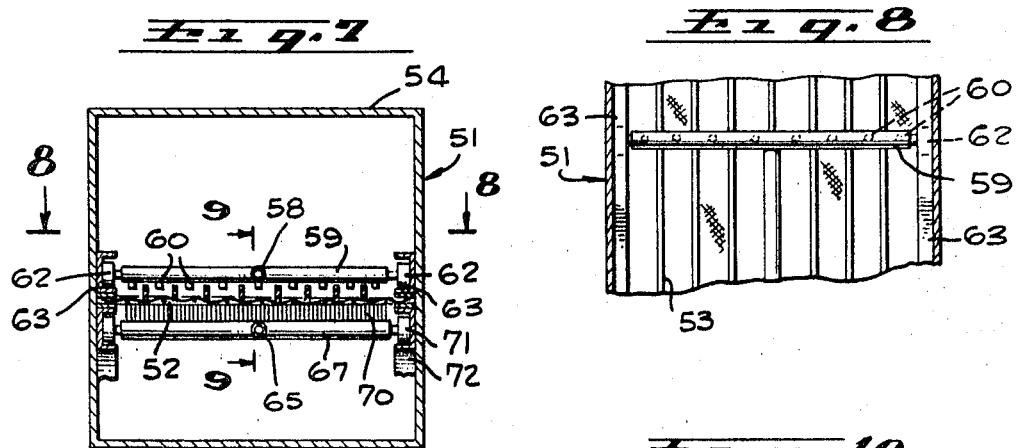
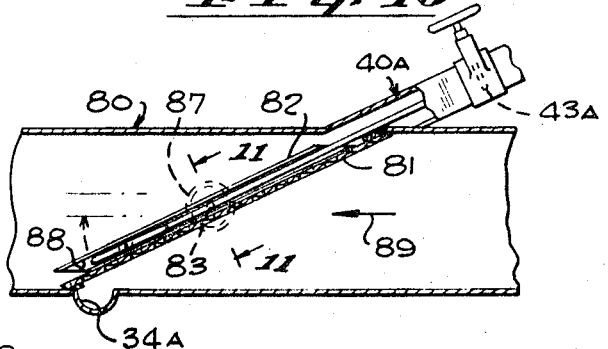
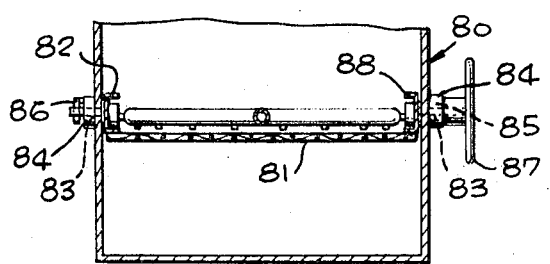

3,469,705
MEANS FOR CLEANING SCREENS IN
PLACE IN A PIPELINE
Robert S. Thomas, 12239 E. 214th St.,
Artesia, Calif. 90701
Filed Mar. 17, 1967, Ser. No. 628,800
Int. Cl. B01d 35/16
U.S. Cl. 210—411     6 Claims

ABSTRACT OF THE DISCLOSURE

The application discloses devices having movable nozzle head assemblies adapted to be supplied with liquid under high pressure mounted in a pipe carrying a liquid to traverse a screen in the pipe for the purpose of cleaning the same and a drainage outlet for the material removed from the screen.

---

This invention has to do with devices for cleaning screens in place in a pipeline by removing material, such as dirt, debris, and growths which accumulate thereon.

An object of the invention is to provide a novel and improved means for use in conjunction with a screen installed in a conduit or pipeline through which water or other liquid is flowing under pressure for the purpose of cleaning the screen in place by dislodging foreign matter which has accumulated on the upstream side of the screen, and removing such matter from the pipeline or conduit.

Another object is to provide a novel nozzle head assembly mounted on the downstream side of a screen installed in a pipeline or other liquid carrying conduit which is movable parallel to the plane of the screen and functions to jet streams of liquid through the screen against the normal flow of liquid therethrough and remove accumulated matter from the screen.

A further object is to provide novel means and a method of utilizing high velocity liquid streams through a screen for removing the accumulated material therefrom in conjunction with suction means for carrying away the removed matter.

Still another object is to provide a novel and improved means for cleaning a screen in place in a conduit which is so constructed that the means can be removed from the pipe or conduit even though the same is in use and carries fluid under pressure without any appreciable loss of liquid from the pipe or conduit.

These and other objects will be apparent from the drawings and the following description. Referring to the drawings:

FIG. 1 is a longitudinal sectional view through a conduit or pipeline and through apparatus embodying the invention installed therein;

FIG. 2 is a plan view of the conduit of FIG. 1 broken away to show the interior and parts in section;

FIG. 3 is a fragmentary sectional view on line 3—3 of FIG. 1, but on a larger scale;

FIG. 4 is a fragmentary sectional view on line 4—4 of FIG. 2, but on a larger scale;

FIG. 5 is a diagrammatic view of a conduit or pipeline section showing a housing attached thereto for a type of removable device;

FIG. 6 is a fragmentary elevational view of a conduit with a special section or adapter and with an alternate form of the invention installed therein, the view being partially broken away to show parts in section;

FIG. 7 is a cross sectional view of the device of FIG. 6 substantially on line 7—7 of FIG. 6;

FIG. 8 is a fragmentary sectional view on line 8—8 of FIG. 7;

FIG. 9 is a fragmentary sectional view on line 9—9 of FIG. 7, but on a larger scale;

FIG. 10 is a longitudinal sectional view through a pipe in which an alternate form of the invention is installed; and FIG. 11 is a cross sectional view on line 11—11 of FIG. 10.

More particularly describing the invention, numeral 11 generally indicates a conduit or pipeline of any type through which it may be assumed that water or other liquid is flowing under pressure in the direction of the arrows 12. This pipe is shown fitted with a screen 13 that is inclined with respect to the axis of the conduit, the screen being supported by the ring 14 and bars 15 which are secured to the interior of the pipe or conduit 11.

One form of the device of the invention is generally designated by numeral 18 and shown in FIGS. 1–4. Referring to these figures, the device includes a wash pipe 20 which extends through a gland 21 provided on the upper end by means of which it may be connected, as, by a flexible high pressure hose 23 to a source of liquid under high pressure. This liquid could be water if that is the liquid being carried by the conduit. At its inner end the wash pipe is provided with a fitting 24 which is shown as generally elliptical and tubular, having a plurality of nozzles 25 arranged in spaced relation and directed toward the screen 13. Guide channels 27 are mounted in parallel relation within the conduit 11 and the fitting provided with guide elements received therein, the elements being shown as rollers 28.

The gland 21 around the wash pipe may incorporate any well-known type of seal and be so designed as to prevent escape of liquid from the interior of the pipe or conduit but at the same time permit of movement of the wash pipe axially therethrough. Any suitable means may be used for moving the wash pipe axially or longitudinally and merely for purposes of illustration I have shown a rack 30 (which would have to be laterally offset unless extended to some height and actuated near the top) connected to the pipe, a pinion 31 meshing with the rack and a motor 32 for driving the pinion. Any suitable controls can be used.

In using the device thus far described, liquid under high pressure from any suitable source is pumped through the wash pipe and issues in high velocity streams from the nozzles 25 so that the liquid in effect jets through the screen 13 to dislodge material which has accumulated on the upstream side thereof. The pipe and hence the fitting is moved so that the nozzles will traverse a large area of the screen. By reason of the inclination of the screen so that its lower end is farthest downstream, the removed matter tends to accumulate below the screen at its lower end and therefore I provide an opening 34 in the conduit which is open to an outlet pipe 35 that is controlled by a valve 36. During the cleaning operation, or immediately thereafter, the valve 36 is opened to allow the matter which has been dislodged from the screen to flow out from the conduit through hole 34 and pipe 35.

In FIG. 5 I show diagrammatically a means for removing the screen cleaning unit from the conduit 11A through which liquid may be flowing under pressure without any substantial loss of liquid from the conduit. This means comprises a housing 40 formed or built onto the conduit which is open at its inner end and which is of a size and shape to pass the fitting 24 or whatever other fitting is employed at the inner end of the wash pipe 20. The outer end of the housing is closed by a removable end plate 41 that can be bolted in place and this has a gland (not shown) through which the wash pipe passes. A movable partition or gate valve 43 (normally open) is provided to close the interior of the housing from the interior of the conduit. Thus if it is desired to withdraw the device from the conduit, the wash pipe is withdrawn until the fitting lies within the housing 40 between the partition or valve 43 and end plate 41, after which the valve 43 is closed to seal off the chamber. The removable end plate 41 can then be removed and the wash pipe and its fitting removed from the housing, as shown in broken lines in FIG. 5.

Referring now to FIGS. 6–9, numeral 50 generally designates a conduit in which there is mounted an adapter or special section 51 of rectangular cross section. Mounted in this latter section is a screen 52 which is supported upon a grill made up of a plurality of parallel strips 53 mounted in the section 51 at the angle shown. The upper wall 54 of the adapter section 51 is formed to provide an upwardly extending rectangular housing 54 having an end wall 55 provided with two glands 56. A screen cleaning device comprising a wash pipe 58, similar to pipe 20 previously described, is mounted in the upper gland 56 and is provided at its inner end with a cross tube 59 fitted with a plurality of spaced nozzles 60 which are directed toward the screen 52. This cross tube or fitting is provided with guide elements at its ends, such as rollers 62, that are received in guide channels 63 mounted in the conduit section 51 parallel to the screen. An outlet pipe 65 is mounted in the other gland and preferably this pipe and the wash pipe are connected together by any suitable coupling or bracket 66 so that they can be moved as a unit. The outlet pipe is also provided with an elongated opening or slot 68 facing the screen and positioned opposite and facing the nozzles 60. If desired, the fitting may be formed to accommodate a brush 70 or a screen scraping device. The cross tube 67 on the outlet tube is also provided with guide rollers at its ends, designated 71, that are received in guide channels 72 mounted in the conduit section 51.

In the operation of this form of the invention the wash pipe 58 is supplied with pressure fluid from any suitable source while a partial vacuum is drawn upon the outlet pipe 65. The two pipes are then moved together to cause the cross tubes at the inner ends thereof to traverse the surface of the screen and dislodge the material thereon which has accumulated as it was removed from liquid flowing through the screen in its normal use. The velocity of the water issuing through the nozzles 60 together with the suction created in the outlet pipe and across the orifice or slot 68 of the cross tube or fitting 67 causes a positive and rapid circulation of fluid through the screen which serves to dislodge the material from the upstream side of the screen. The brush or a scraping means which might be employed also serves to assist in the removal of material from the screen.

Referring now to FIGS. 10 and 11, numeral 80 designates a pipe or conduit in which I provide a screen 81 on a frame 82 which is pivotally mounted in the pipe by means of trunnions 83 on the frame. The trunnions are journaled in bosses 84 at each side of the pipe. Any suitable seal 85 may be provided around the trunnions. A releasable latch mechanism 86 on one of the trunnions serves to hold the screen assembly in position, as shown, while a handwheel 87 on the other provides a means for pivoting it.

The screen frame 82 is formed to provide guide channels 88 to receive the guide rollers at the ends of a means for washing or flushing the screen, such as the means shown in FIG. 2, for example, comprising the wash pipe 20 and elliptical tube 24. This assembly may be made removable through a housng 40A which is similar to that shown and described in FIG. 5 and corresponding parts are similarly numbered but distinguished by the letter "A."

This particular form of the invention is designed for installations where the system as a whole of which the pipe 80 forms a part may be reverse circulated at times so that the flow will be opposite to the normal direction which is designated by the arrow 89. In such cases it is desirable to reduce the resistance to flow by turning the screen assembly so that it is parallel to the longitudinal axis of the pipe. This can be done by means of a powered device or handle means, such as the handwheel 87. Before the screen is turned, the screen washing means is necessarily removed through the assembly 40A.

Although I have illustrated and described a preferred form of my invention, I contemplate that various changes and modifications can be made therein without departing from the invention, the scope of which is indicated by the following claims.

I claim:

1. In means for cleaning a screen in place in a conduit through which liquid is flowing, comprising a gland on the conduit downstream but adjacent the screen therein, a wash pipe received in said gland and having one end portion within the conduit and the other end portion exteriorly thereof, a fitting at the inner end of said pipe having a plurality of nozzles directed toward said screen, and means for connecting the outer end of said pipe to a source of liquid under high pressure, said pipe being movable axially through the gland whereby to cause said nozzles to traverse the screen, said conduit being provided with guideways for said fitting extending parallel to said screen, and said fitting being provided with guide elements engageable with said guideways.

2. The means set forth in claim 1 in which a valved outlet pipe is connected to said conduit and has an inlet open thereto at the bottom of the screen immediately upstream thereof.

3. In means for cleaning a screen in place in a conduit through which liquid is flowing, comprising a gland on the conduit downstream but adjacent the screen therein, a wash pipe received in said gland and having one end portion within the conduit and the other end portion exteriorly thereof, a fitting at the inner end of said pipe having a plurality of nozzles directed toward said screen, and means for connecting the outer end of said pipe to a source of liquid under high pressure, said pipe being movable axially through the gland whereby to cause said nozzles to traverse the screen, a suction pipe mounted in said conduit on the upstream side of said screen having an inlet opposite said fitting facing the same and said screen, said suction pipe being movable along the screen with said wash pipe, the outer end of said suction pipe being exteriorly of said conduit and adapted to be connected to means for lowering the pressure therein.

4. In means for cleaning a screen in place in a conduit through which liquid is flowing under pressure, comprising a housing on the conduit forming a chamber laterally of but open to the conduit, said chamber having a removable outer end with a gland therein, a wash pipe received in said gland and extending through said chamber into said conduit, a fitting at the inner end of said pipe adjacent said screen on the downstream side thereof and having a plurality of nozzles directed toward the screen, said wash pipe being adapted at its outer end to being connected to a source of liquid under high pressure, said pipe being movable axially through the gland whereby to cause said nozzles to traverse the screen, and a gate valve-like means at the inner end of said housing for closing off the chamber from said conduit.

5. In a liquid screening system, a pipe, a screen assembly pivotally mounted intermediate its ends in the pipe and so shaped and constructed that said assembly can be positioned across the interior of the pipe or on a plane substantially coincident with the axis of the pipe, guideways carried by said screen assembly, a wash pipe having nozzles at its inner end extending into said pipe upstream of said screen assembly and guided in said guideways, means for removing said wash pipe to permit said screen assembly to be pivoted, and means for pivoting said screen assembly from outside said pipe.

6. In combination, a conduit through which liquid is adapted to flow completely filling the conduit, said conduit having a generally horizontal section, a screen disposed in and across the interior of the horizontal section of the conduit, said screen being disposed at an inclined angle so constructed that the screen forms an acute angle with the horizontal on the upstream side of the screen, a gland on the conduit downstream but adjacent the screen therein, a wash pipe received in and axially movable through the gland, said pipe having nozzle means at its inner end closely adjacent and directed toward said screen, means for connecting the outer end of said pipe to a source of liquid under high pressure, and means forming a valved outlet at the bottom of the conduit adjacent said screen on the upstream side thereof.

References Cited

UNITED STATES PATENTS

| | | | |
|---|---|---|---|
| 246,003 | 8/1881 | Goldmann | 210—411 |
| 1,130,725 | 3/1915 | Getts | 210—414 X |
| 1,987,142 | 1/1935 | Clements | 210—414 X |
| 3,040,898 | 6/1962 | Simmons | 210—447 X |
| 3,209,914 | 10/1965 | Nordell et al. | 210—413 X |
| 3,318,075 | 5/1967 | Wilson | 55—242 X |

REUBEN FRIEDMAN, Primary Examiner

J. ADEE, Assistant Examiner

U.S. Cl. X.R.

210—414, 447